United States Patent
Papiernik et al.

(10) Patent No.: US 7,099,720 B2
(45) Date of Patent: Aug. 29, 2006

(54) METHOD FOR IDENTIFYING A CONTROL PATH OF A CONTROLLED SYSTEM

(75) Inventors: Wolfgang Papiernik, Neunkirchen (DE); Guido Stöppler, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 328 days.

(21) Appl. No.: 10/753,968

(22) Filed: Jan. 8, 2004

(65) Prior Publication Data

US 2004/0162624 A1 Aug. 19, 2004

(30) Foreign Application Priority Data

Jan. 9, 2003 (DE) .............. 103 00 543

(51) Int. Cl.
*G05B 13/02* (2006.01)

(52) U.S. Cl. .............. 700/38; 700/28; 700/29; 700/78; 700/44

(58) Field of Classification Search .............. 700/28, 700/29, 38, 78, 30, 44, 45, 31
See application file for complete search history.

(56) References Cited

U.S. PATENT DOCUMENTS

| | | | |
|---|---|---|---|
| 3,655,954 A * | 4/1972 | Speth .............. | 700/29 |
| 5,036,265 A * | 7/1991 | Weihrich et al. .............. | 318/618 |
| 5,483,438 A * | 1/1996 | Nishimura .............. | 700/29 |
| 5,777,871 A * | 7/1998 | Wise .............. | 700/29 |
| 6,094,602 A * | 7/2000 | Schade, III .............. | 700/45 |
| 6,721,608 B1 * | 4/2004 | Rutherford .............. | 700/28 |
| 6,912,426 B1 * | 6/2005 | Kerner .............. | 700/8 |

* cited by examiner

*Primary Examiner*—Anthony Knight
*Assistant Examiner*—Thomas Pham
(74) *Attorney, Agent, or Firm*—Henry M. Feiereisen

(57) ABSTRACT

A method for identifying a control path of a controlled system, and more particularly to a method for identifying a control path in the presence of deterministic perturbations is described. At least one deterministic perturbation correcting signal is determined in a first identification process, and the perturbation correcting signal is stored in the form of a function. A control path of the controlled system is identified in a second identification process by adding to the controlled system the at least one stored deterministic perturbation correcting signal with a negative feedback. The method can be used with machine tools, production machines and/or robots which demand a high control accuracy and/or a high-quality control characteristic. In particular, perturbation effects due to slot latching in motors, in particular linear motors, can be minimized.

16 Claims, 2 Drawing Sheets

METHOD FOR IDENTIFYING A CONTROL PATH OF A CONTROLLED SYSTEM

CROSS-REFERENCES TO RELATED APPLICATIONS

This application claims the priority of German Patent Application, Serial No. 103 00 543.9, filed Jan. 9, 2003, pursuant to 35 U.S.C. 119(a)–(d), the disclosure of which is incorporated herein by reference.

BACKGROUND OF THE INVENTION

The present invention relates to a method for identifying a control path of a controlled system, and more particularly to a method for identifying a control path in the presence of deterministic perturbations.

A high-quality identification of a controlled system form an important basis for optimizing a closed-loop control circuit. A controlled system is typically identified by applying a suitable stimulus signal at the input of the controlled system and measuring the path response at the output of the controlled system. The controlled system can be described by a transfer function which can be identified by measuring the path response to the stimulus signal.

The transfer function can be determined either in the time domain by observing the time evolution of the stimulus signal and the path response or, as is commonly done in this technical field, in the frequency domain.

For identifying the controlled system in the frequency domain, both the stimulus signal and the path response are transformed into the frequency domain through a Fourier transform. The transfer function of the controlled system in the frequency domain is obtained in the form of a complex transfer function by dividing the Fourier-transformed path response by the Fourier-transformed stimulus signal.

The frequency response of the magnitude and/or the phase of the complex transfer function of the controlled system can then be determined from the complex transfer function of the controlled system.

In practical applications, perturbations and/or perturbation signals make often make it difficult to reliably identify a path of the controlled system that is to be controlled. A distinction can be made between two types of perturbations that can occur, which can be referred to as stochastic perturbations and deterministic perturbations.

The impact of stochastic perturbation signals on the identification of the controlled system can be lessened by performing a sufficiently large number of averages and/or by low-pass filtering and/or by analyzing the correlation of one or several perturbation signals. However, these measures operate only in a limited fashion with deterministic perturbation signals, or do not work at all.

Errors in the identification of controlled systems in the presence of deterministic perturbation signals have so far been unavoidable and had to be tolerated, since the above-mentioned methods were inadequate to significantly reduce these errors. As a result, the controlled system could not be reliably identified in the frequency range where the deterministic perturbation signals occur.

The European patent publication EP 0 211 374 A1 describes a device for compensating the effect of gravity on an element of a machine-tool or a robot that can be raised and lowered by an electric motor, and a method for operating such a device. The patent application describes optimizing a controller setting by applying a perturbation signal.

It would therefore be desirable and advantageous to provide an easy-to-use and cost-effective method for identifying a control path of a controlled system, which obviates prior art shortcomings and is able to specifically identify a control path in the presence of deterministic perturbations.

SUMMARY OF THE INVENTION

According to one aspect of the present invention, a method for identifying a control path of a controlled system includes the steps of determining at least one deterministic perturbation correcting signal in a first identification process; storing the perturbation correcting signal in the form of a function; and identifying a control path of the controlled system in a second identification process by adding to the controlled system the at least one stored deterministic perturbation correcting signal with a negative feedback.

According to another advantageous feature of the invention, the function can be conveniently stored in the form of a table and/or in the form of splines. When the function is stored in the form of splines, intermediate values of the function can be easily determined and/or outputted by way of interpolation.

According to another advantageous feature of the invention, the at least one deterministic perturbation correcting signal can be determined from an output signal obtained from at least one controller of a closed control loop of the controlled system. The controller already filters stochastic perturbations implicitly, since the controller typically exhibits a bandpass characteristic. Many situations then no longer require additional filtering measures for reducing the effect of stochastic perturbations.

Advantageously, an amplification factor of the controller can be set to a high value for determining the deterministic perturbation correcting signal in the first identification process. In this way, the perturbation is particularly well embodied in the controller.

According to another advantageous feature of the invention, an amplification factor of the controller can be set to a low value for identifying a control path of the controlled system in the second identification process. This approach minimizes the effect of the controller on the path identification of the controlled system in the second identification process.

According to another advantageous feature of the invention, a stimulus signal for exciting the controlled system can be applied in the second identification process to the input of the controlled system. Conventional controlled systems are typically excited with a stimulus signal.

Advantageously, the stimulus signal can have a broadband frequency spectrum, which simplifies the identification of the controlled system.

According to another advantageous feature of the invention, the perturbation correcting signal can be added at the same location where a deterministic perturbation is applied in the controlled system. If the location where the perturbation is applied in the controlled system is identical to the point of attack of the deterministic perturbation, then the effect of the deterministic perturbation can be effectively reduced.

According to another advantageous feature of the invention, the control path of the controlled system in the second identification process can be identified by Fourier-transforming both an input signal and an output signal of the controlled system into the frequency domain; dividing the Fourier-transformed output signal by the Fourier-transformed input signal; and computing a complex transmission function of the controlled system to identify the control path. The complex transmission function can include a frequency response of a magnitude and of a phase of the controlled system. The identification of the controlled system in the frequency domain is generally viewed having distinct advantages.

A method according to the present invention is particularly well-suited for path identification of a controlled system employed in machine tools, production machines and/or robots, since the controlled systems in these applications typically experience stochastic perturbations. In particular, a method according to the invention is suited for path identification in a controlled system employed with drives for machine tools, production machines and/or robots. Such systems can be affected by perturbation effects due to slot latching, which can adversely affect the drive control circuits.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
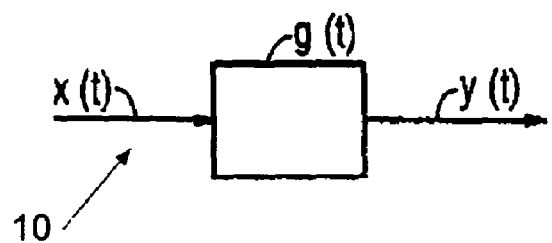
FIG. 1 shows a schematic diagram of a controlled system.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a block circuit diagram of a controlled system 10 in the time domain with a transfer function g(t), which transforms a time-dependent input signal x(t) into a time-dependent output signal y(t). In many technical fields, the transfer function g(t) of the controlled system is preferably identified in the frequency domain. First, a Fourier transform is applied to both the input signal x(t) and the output signal y(t), transforming the two time-dependent functions into the frequency domain. The Fourier transform produces a corresponding frequency-dependent input function X(s) and a corresponding frequency-dependent output function Y(s), whereby s indicates the complex angular frequency jω.

The complex transfer function G(s) of the controlled system in the frequency domain is obtained by computing the quotient $$\frac{Y(s)}{X(s)} = G(s)$$

wherein the complex transfer function G(s) is obtained over the frequency range used in the Fourier transform.

The frequency response of the magnitude and the phase of the controlled system can be easily determined from the complex transfer function G(s) in a conventional manner. For identifying the controlled system over a relatively broad-band frequency range, an relatively short input signal x(t) in the form of a so-called stimulus signal is typically applied which corresponds to a broad-band signal in the frequency range. One example of a stimulus signals is a rectangular pulse in the time domain.

Figure 2:
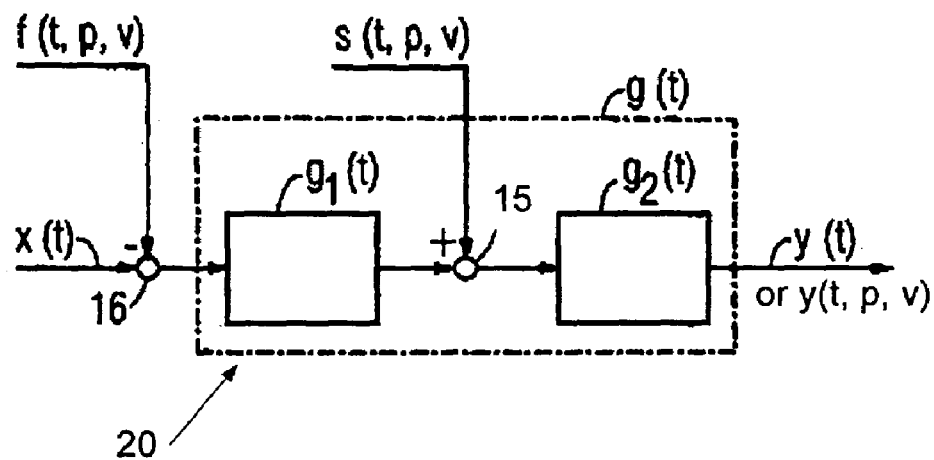
FIG. 2 shows a controlled system compensated against perturbations according to the method of the present invention.

FIG. 2 shows a block circuit diagram 20 of one exemplary embodiment of the method according to the invention. In FIG. 2, the transfer function g(t) of the controlled system depicted in FIG. 1 is divided into two sequential partial transfer functions $g_1(t)$ and $g_2(t)$, which describe the controlled system to be identified. As depicted in FIG. 2, a deterministic perturbation signal s(t, p, v) is applied to the controlled system at a terminal 15. The exemplary perturbation signal s(t, p, v) depend not only on the time t, but also on a location p and/or a velocity v. However, the deterministic perturbation signal can also depend on a single parameter, such as the parameter p, or on more than three parameters. The output signal y, in response to the perturbation s, would then likely also dependent not only on the time t, but also on the location p and the velocity v, and can be represented by an output signal y(t, p, v). The system is then no longer linear and the controlled system can no longer be identified. At this point, the method of the invention can advantageously be applied.

As also shown in FIG. 2, a perturbation compensation signal f(t, p, v) that has been determined in a first identification process is introduced at a location 16 in a second identification process that follows the first identification process. The location where the perturbation compensation signal f(t, p, v) is introduced does not necessarily have to coincide with the location 15 of the perturbation itself. Depending on the particular situation, the output signal y(t) can depend only on the time t, as depicted in FIG. 2, or can more generally also depend on p and v, assuming the form y(t, p, v). In the special situation where the perturbation compensation signal f(t, p, v) is introduced at a location 16 that is identical to the location 15 where the perturbation signal s(t, p, v) is introduced, the perturbation compensation signal f(t, p, v) is identical to the perturbation signal s(t, p, v).

Figure 3:
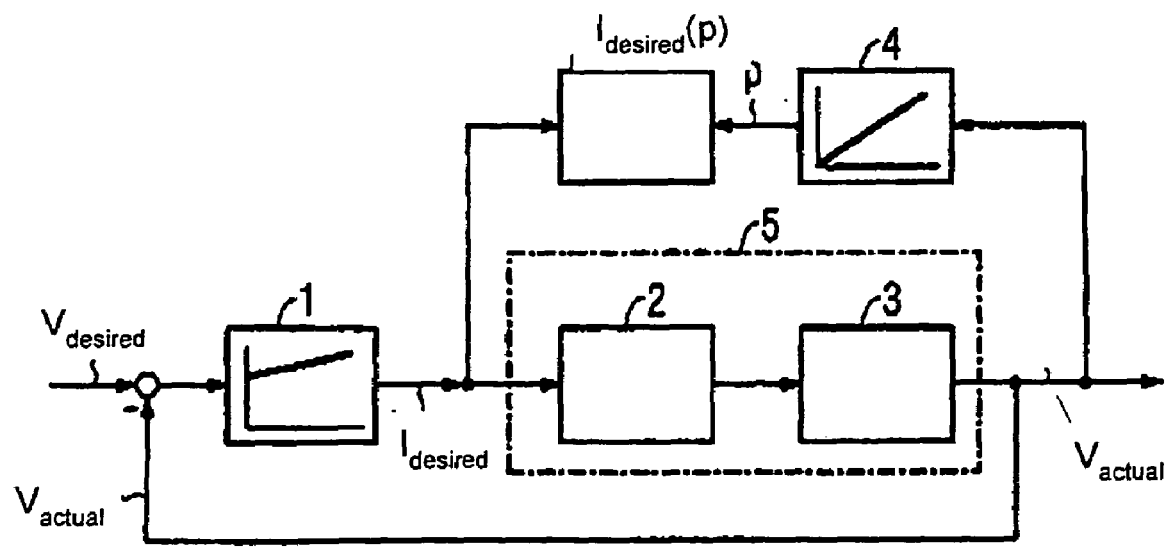
FIG. 3 shows a first process for identifying a controlled system.
Figure 4:
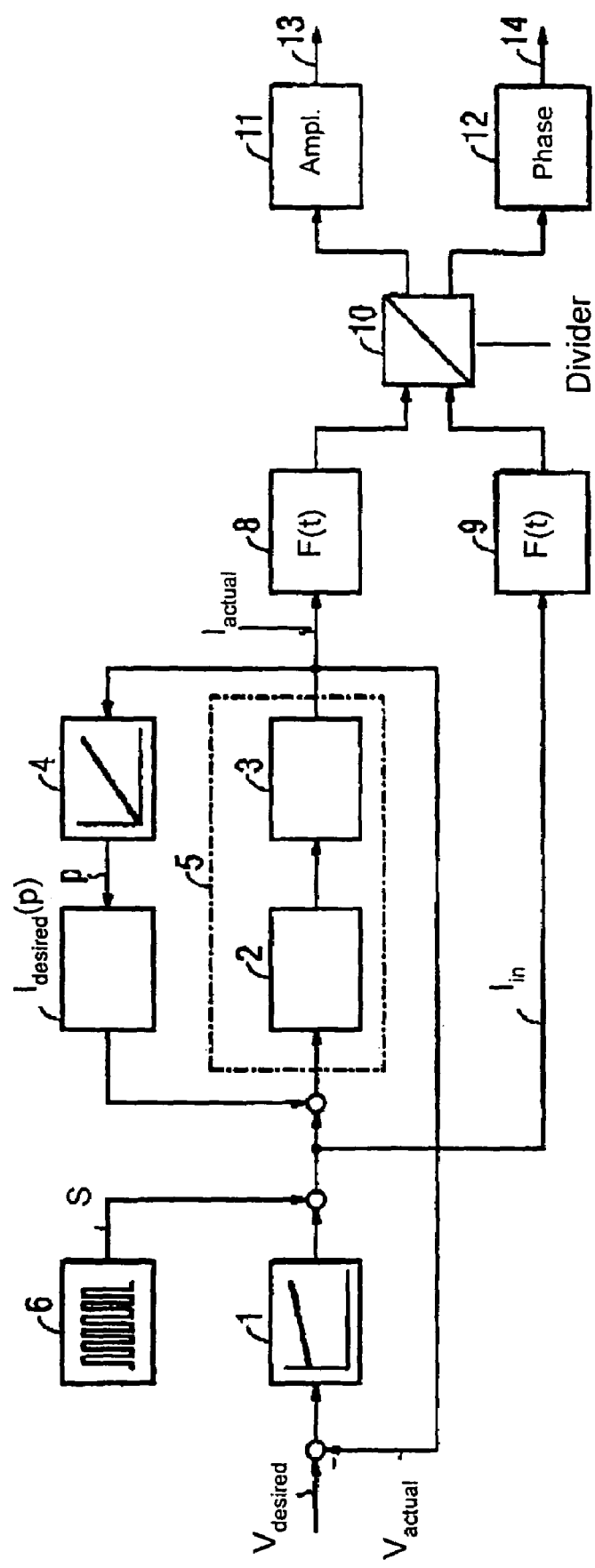
FIG. 4 shows a second process for identifying a controlled system.

FIGS. 3 and 4 illustrate exemplary embodiments of the method of the invention. In FIG. 3 and FIG. 4, respectively, a controlled system 5 is identified that consists of a power control unit 2 and a permanent-magnet-excitedly linear motor 3 with an iron core. The slot latching forces produced by a non-uniform magnetic field distribution in the linear motor 3 can cause a location-dependent deterministic perturbation s(p). The perturbation s(p) due to the slot latching forces depends only on the location p. The perturbation s(p) is not explicitly shown in FIGS. 3 and 4, since it takes place inside the linear motor 3.

FIG. 3 shows in the form of a block circuit diagram the first identification process according to the method of the invention. The controlled system 5 to be identified is here formed by a power control unit 2 and a linear motor 3. A PI-controller 1 (Proportional-Integral-controller) together with the controlled system 5 forms a closed control loop. The difference between a desired velocity value $v_{desired}$ and an actual velocity value $v_{actual}$ measured on the linear motor 3 by a transducer (not shown) is provided as an input value to the PI-controller 1. The PI-controller 1 supplies as an output value a desired current $i_{desired}$ to the power control unit 2 which in turn controls the linear motor 3. In the first identification process, a deterministic perturbation compensation signal is determined and stored in the form of a function f(p). The amplification factor of the PI-controller 1 is set to a high value, so that the deterministic perturbation effects due to slot latching of the linear motor 3 are distinctly expressed in the output signal $i_{desired}$ of the PI-controller 1. Since the perturbation effects due to slot latching of the linear motor 3 depend on the location parameter p of the rotor of the linear motor 3, the location parameter p is determined at the output of the linear motor 3 from the motor speed $v_{actual}$ by an integrator 4. A value $i_{desired}$ can now be uniquely associated with each location p, so that a function $i_{desired}(p)$ that depends on the location p can be written to a table and/or stored in a table.

The perturbation effects due to slot latching are then well represented in the integral section of the PI-controller 1.

FIG. 4 shows in the form of a block circuit diagram the second identification process according to the method of the invention. In order minimize the impact of the PI-controller 1 on the identification of the controlled system within the second identification process, the amplification factor of the PI-controller 1 is set to the lowest possible value. A signal generator 6 supplies a stimulus signal S at the output of the PI-controller 1 and/or at the input of the controlled system 5. For compensating the deterministic perturbation effects due to slot latching, the stored perturbation compensation signal is supplied to the input of the controlled system 5 with negative feedback in the form of the function $i_{desired}(p)$ which depends on the location parameter p.

The path of the controlled system 5 is identified in the frequency domain in a conventional manner. The input signal $i_{in}$ of the controlled system is Fourier-transformed into the frequency domain in functional block 9, whereas the output signal $v_{actual}$ of the controlled system 5 is Fourier-transformed into the frequency domain in functional block 8. In functional block 10, the output signal $v_{actual}$ of the controlled system, which has been transformed into the frequency domain, is subsequently divided by the input signal $i_{in}$ of the controlled system which also has been transformed into the frequency domain. This process produces the complex transfer function of the controlled system at each of the frequencies employed in the Fourier transform.

The determined complex transfer function is typically represented in the form of a frequency response of the magnitude 13 and a frequency response of the phase 14, which makes it easier to interpret the path attributes. The magnitude of the frequency response can be determined by separately forming the square of the real part and the imaginary part of the complex transfer function at each frequency in a functional block 11 and adding the squares and by then forming the square root, which can be plotted as a function of the frequency. The phase of the frequency response can be determined by dividing the imaginary part of the complex transfer function at each frequency by the corresponding real part of the complex transfer function in functional block 12. The phase angle can then determined by computing the arc tan function of the quotient of the real and imaginary part and plotted as a function of the frequency. In this way, the controlled system is uniquely identified.

Optionally, the transfer function G(s) determined in the frequency domain can be transformed back into the time domain by an inverse Fourier transform. It should be mentioned at this point that the function $i_{desired}$ can also be stored in the form of splines. This can be used to interpolate, for example, intermediate values, or to reduce the size of the memory space required for storing the function $i_{desired}(p)$.

In particular, the method of the invention can be used to accurately identify a controlled system in technical fields that include machine tools, production machines and/or robots which demand a high-precision control and/or a high-quality control characteristic. The method of the invention can also be used to minimize perturbation effects due to slot latching in motors, in particular linear motors, which would otherwise interfere with the identification of the controlled system in such drives.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for identifying a control path of a controlled system, comprising the steps of:
   determining at least one deterministic perturbation correcting signal in a first identification process;
   storing the perturbation correcting signal in the form of a function;
   identifying a control path of the controlled system in a second identification process by adding to the controlled system the at least one stored deterministic perturbation correcting signal with a negative feedback; and
   applying in the second identification process to the input of the controlled system a stimulus signal for exciting the controlled system,
   wherein the stimulus signal has a broad-band frequency spectrum.

2. The method of claim 1, wherein the function is stored in the form of a table and/or in the form of splines.

3. The method of claim 2, wherein the at least one deterministic perturbation correcting signal is determined from an output signal obtained from at least one controller of a closed control loop of the controlled system.

4. The method of claim 3, and further comprising the step of setting an amplification factor of the controller to a high value for determining the deterministic perturbation correcting signal in the first identification process.

5. The method of claim 3, and further comprising the step of setting an amplification factor of the controller to a low value for identifying a control path of the controlled system in the second identification process.

6. The method of claim 1, wherein the perturbation correcting signal is added at the same location where a deterministic perturbation is applied in the controlled system.

7. Use of the method of claim 1 for identifying a control path of a controlled system employed in a machine tool, a production machine or a robot.

8. Use of the method according to claim 7 for identifying the control path of a controlled system experiencing perturbation effects from slot latching of a drive motor driving a machine tool, a production machine or a robot.

9. A method for identifying a control path of a controlled system, comprising the steps of:
   determining at least one deterministic perturbation correcting signal in a first identification process;
   storing the perturbation correcting signal in the form of a function; and
   identifying in a control path of the controlled system in a second identification process by adding to the controlled system the at least one stored deterministic perturbation correcting signal with a negative feedback,
   wherein identifying the control path of the controlled system in the second identification process includes the steps of Fourier-transforming an input signal and an output signal of the controlled system into the frequency domain, dividing the Fourier-transformed output signal by the Fourier-transformed input signal, and computing a complex transmission function of the controlled system to identify the control path.

10. The method of claim 9, wherein computing the complex transmission function includes computing a frequency response of a magnitude and of a phase of the controlled system.

11. The method of claim 9, wherein the function is stored in the form of a table and/or in the form of splines.

12. The method of claim 11, wherein the at least one deterministic perturbation correcting signal is determined from an output signal obtained from at least one controller of a closed control loop of the controlled system.

13. The method of claim 12, and further comprising the step of setting an amplification factor of the controller to a high value for determining the deterministic perturbation correcting signal in the first identification process.

14. The method of claim 12, and further comprising the step of setting an amplification factor of the controller to a low value for identifying a control path of the controlled system in the second identification process.

15. Use of the method of claim 9 for identifying a control path of a controlled system employed in a machine tool, a production machine or a robot.

16. Use of the method according to claim 15 for identifying the control path of a controlled system experiencing perturbation effects from slot latching of a drive motor driving a machine tool, a production machine or a robot.

* * * * *